(12) United States Patent
Vetaal et al.

(10) Patent No.: US 9,462,137 B2
(45) Date of Patent: Oct. 4, 2016

(54) SYSTEM AND METHOD FOR DATA USAGE MANAGEMENT IN AN ELECTRONIC DEVICE

(71) Applicant: Samsung Electronics Co., Ltd., Gyeonggi-do (KR)

(72) Inventors: Ananya Vetaal, Bhopal (IN); Aditi Chaturvedi, Kanpur (IN); Shreyoshi Ghosh, Kolkata (IN); Roma Singh, Ghaziabad (IN); Munwar Khan, Maharashtra (IN); Varun Airon, Haryana (IN); Priyanka Goel, Roorkee (IN); Akhilesh Gupta, Ghaziabad (IN)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/507,227

(22) Filed: Oct. 6, 2014

(65) Prior Publication Data
US 2015/0099483 A1 Apr. 9, 2015

(30) Foreign Application Priority Data
Oct. 4, 2013 (IN) ............................ 2960/DEL/2013

(51) Int. Cl.
*H04M 15/00* (2006.01)
*H04L 12/14* (2006.01)
*H04W 4/24* (2009.01)

(52) U.S. Cl.
CPC .......... *H04M 15/83* (2013.01); *H04L 12/1417* (2013.01); *H04L 12/1435* (2013.01); *H04M 15/8214* (2013.01); *H04M 15/835* (2013.01); *H04M 15/8351* (2013.01); *H04M 15/8353* (2013.01); *H04M 15/8355* (2013.01); *H04M 15/853* (2013.01); *H04M 15/854* (2013.01); *H04L 12/1421* (2013.01); *H04W 4/24* (2013.01)

(58) Field of Classification Search
CPC ..................... G06Q 30/0283; G06Q 30/0277; H04M 15/83; H04W 4/24; H04N 21/4784; H04L 41/22
USPC .......... 455/405, 3.06, 456.3; 705/26.4, 14.49
See application file for complete search history.

(56) References Cited

U.S. PATENT DOCUMENTS

| | | | |
|---|---|---|---|
| 6,188,997 B1 | 2/2001 | Ratzenberger, Jr. et al. | |
| 2013/0246213 A1* | 9/2013 | Lee .................... | G06Q 30/0283 705/26.4 |
| 2014/0164106 A1* | 6/2014 | Naik .................. | G06Q 30/0277 705/14.49 |

OTHER PUBLICATIONS

DU Meter for Android, http://www.hageltech.com/android/dumeter, Jun. 2, 2015.
AndroidAuthority, How to Monitor Data Usage and Cost in Your Local Currency, Jun. 2, 2015.

* cited by examiner

*Primary Examiner* — Phuoc H Doan
(74) *Attorney, Agent, or Firm* — The Farrell Law Firm, P.C.

(57) ABSTRACT

A system and method for data usage management in an electronic device is provided. The method includes tracking an estimated cost of a download in a currency set by a user, determining the estimated cost of the download in the currency set by the user, displaying the estimated cost of the download, determining application data usage, implementing notifications of the data usage, and displaying the data usage, wherein a widget or an application is used to display the data usage.

12 Claims, 10 Drawing Sheets

FIG.9

SYSTEM AND METHOD FOR DATA USAGE MANAGEMENT IN AN ELECTRONIC DEVICE

PRIORITY

This application claims priority under 35 U.S.C. §119(a) to an Indian Patent Application filed on Oct. 4, 2013 in the Indian Patent Office and assigned Serial No. 2960/DEL/2013, the entire disclosure of which is incorporated herein by reference.

BACKGROUND OF THE INVENTION

1. Field of the Invention

The present invention relates generally to a system and method for data usage management in an electronic device, and more particularly, to a system and method for providing enhanced control over estimate and overall cost and consumption of data in electronic devices.

2. Description of the Related Art

Today is an era of smart phone wired or wireless devices such as, but not limited to, tablets, phablets, Personal Digital Assistants (PDAs), touch phones, feature phones, wearable computing devices, handheld devices, flexible devices, etc. As the usage of smart phone devices increases so does the uses of associated technology such as, but not limited to, Internet surfing, web chatting, instant messaging, etc. Also, there are certain applications which run in the background. However, a user of the device is mostly unaware of the data usage of the various applications or technologies which are running. The effect of this lack of awareness is that the user has to bear the additional cost of the data download.

There are several ways in which the user can identify the data usage, like using the "data usage" setting in the Android devices. However, these are all limited to the fact that the usage is shown in the form of data units, like MBs (Megabytes) or in GBs (Gigabytes) or the like. The user is more concerned about the cost of the data used and is less concerned with the technical terms of the data units.

A conventional solution describes a system and method of providing a notification to the mobile device when the thresholds of certain variables are reached. However, notification is only for the threshold reached.

The prior art does not give the user a firsthand experience where he can instantaneously check his data usage nor does it give the user the flexibility to check the data usage in the form of a currency of his choice. The present invention describes a system and method to provide a user with the flexibility to check the data usage by the incurred cost.

SUMMARY

The present invention has been made to address at least the problems and disadvantages described above, and to provide at least the advantages described below. Accordingly, an aspect of the present invention is to provide a system and a method for helping a user to save costs by providing enhanced control over data costs and data usage in mobile devices.

According to another aspect, the present invention provides a system and method to show estimated cost by enabling people to view the price they will have to pay for consuming content before, after and during downloading of the data or streaming content.

According to another aspect, the present invention provides a system and method that will provide a notification to a user when certain thresholds have been reached or exceeded or about to be exceeded as set by user, relating to data consumption in the form of data usage notifications for a particular time period such as but not limited to daily notification, monthly notification, etc. to keep track and manage the data usage by the user. It also provides a system and method that will allow a user to set restrictions on data usage and downloading.

According to another aspect, the present invention provides a system and method to track the download expenses in currency set by the user such as but not limited to local currency, currency of a foreign country, etc., as data usage in data units is not understood by users and budgeting in terms of money is easier rather than data units.

According to another aspect, the present invention provides widgets or applications and data displays for monitoring data cost for a time period.

According to another aspect, the present invention provides a system and method to provide data handover on roaming.

According to another aspect of the present invention, an Application data usage indication is provided which allows the users to view the amount of data being consumed in indicator area, while accessing the application.

In accordance with an aspect of the present invention, a method for data usage management in an electronic device is provided. The method includes tracking an estimated cost of a download in a currency set by a user, determining the estimated cost of the download in the currency set by the user, displaying the estimated cost of the download, determining application data usage, implementing notifications of the data usage, and displaying the data usage, wherein a widget or an application is used to display the data usage.

In accordance with another aspect of the present invention, a method for data handover on roaming in a multi-SIM phone is provided. The method includes switching data services to a non-roaming SIM from a roaming SIM, when a non-roaming SIM data preference is set prior to the multi-SIM phone moving from a non-roaming area to a roaming area, and switching data services to the non roaming SIM from the roaming SIM, when the SIM is in a roaming area and the non-roaming SIM data preference is set after the multi-SIM phone is moved to the roaming area.

In accordance with another aspect of the present invention, a system for data usage management in an electronic device is provided. The system includes a cost estimation unit configured to determine an estimated cost of a download before, after and during downloading of data, a notification generation unit configured to display notifications and restrict data usage, when a threshold is reached, a widget configured to graphically represent the data usage, and an application data usage unit configured to determine application data usage.

BRIEF DESCRIPTION OF THE DRAWINGS

The above and other aspects, features, and advantages of certain embodiments of the present invention will be more apparent from the following description taken in conjunction with the accompanying drawings, in which.

DETAILED DESCRIPTION OF EMBODIMENTS OF THE PRESENT INVENTION

The embodiments of the present invention and the various features and advantageous details thereof are explained more fully with reference to the accompanying drawings. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

Figure 1:
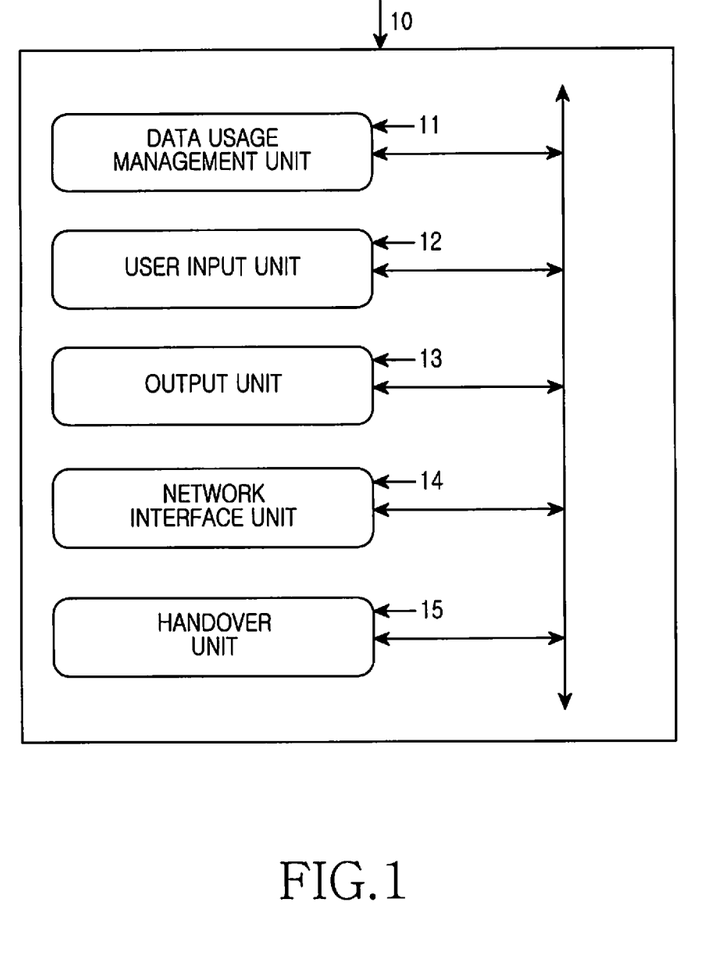
FIGS. 1 and 2 are block diagrams illustrating a data usage management system, according to an embodiment of the present invention.
Figure 2:
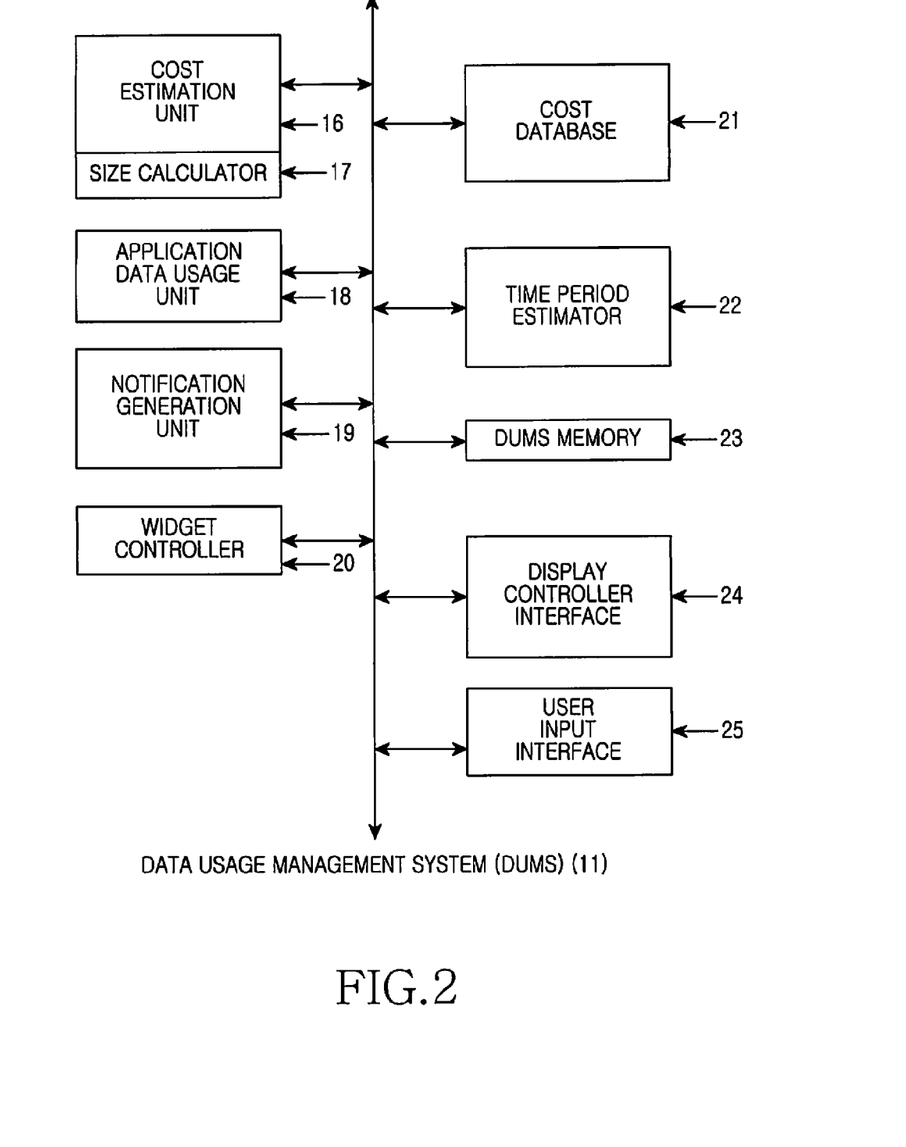

FIGS. 1 and 2 are block diagrams illustrating a data usage management system, according to an embodiment of the present invention.

Referring to FIG. 1, a system for monitoring a mobile communication device is provided. The system provides enhanced control over overall cost and consumption of data in a mobile device by providing an estimate of the cost of a download before, after and during downloading of the data.

The system 10 includes a Data Usage Management System (DUMS) unit 11, a user input unit 12, output unit 13, a network interface unit 14, and a handover unit 15, wherein all the units are bidirectional units and are connected to a common system bus. The system gives output based on the input given by user.

The handover unit 15 is for switching data services in multi-SIM phones from roaming SIM to non-roaming SIM. A roaming SIM is a SIM which is outside of the home network i.e., a SIM whose connectivity service is extended in a location that is different from the home location, that is, the location where the service was registered. On the other hand, the home SIM or non-roaming SIM is a SIM whose connectivity service is inside the home network or inside a particular boundary where the SIM is registered. Data handover is the process of transferring the data services from one SIM to another SIM, i.e., from a roaming SIM to a home SIM or non roaming SIM.

The handover unit of the system of present invention further includes means for reading SIM data preference setting; means for checking current data subscription of the SIM; means for switching the data services to other SIM; and means for enabling data services.

Referring to FIG. 2, a Data Usage Management System unit 11 of the system 10 is provided. The system includes a cost estimation unit 16, a size calculator 17, an application data usage unit 18, a notification generation unit 19, a widget controller 20, a cost database 21, a time period estimator 22, a DUMS memory 23, a display controller interface 24, and a user input interface 25.

The cost estimation unit 16 is for cost estimation of the download before, after and during downloading of the data. The cost estimation unit 16 further includes means for calculating the size of a selected file, means for reading cost details from settings, means for estimating cost, and a display unit for viewing the estimated cost.

The notification generation unit 19 is for displaying notifications and restricting data usage, when a threshold is reached. The notification generation unit 19 further includes means for calculating data usage threshold; means for checking data usage by reading consumed data usage details from a radio and/or network interface; means for showing notifications; and means for restricting data usage based on a threshold.

The display controller interface 24 is for displaying a widget or an application and data displays for graphical representation of consumed data, According to an embodiment of the present invention, a system and method provides a user with an option to track and control individual applications so that they do not consume data in the background and during, but not limited to, roaming. The system and method of the present invention gives users a reminder to switch to a Home network for data usage.

The system of the present invention shows the details of data usage in a currency set by the user. The user is shown the estimated cost and if the user thinks the cost is too high he can schedule the download for a later time when another type of data communication channel, such as but not limited to Wi-Fi, Bluetooth, etc, is available. The user may choose to share this download cost with people nearby using a separate Data Pooling application. The user may also decide to add this file to a wish list and download it later.

According to an embodiment of the present invention, the user is given notification when the user is about to exceed a data limit. This will help the user to control the usage such as on a daily and monthly basis. The user can set the threshold for the notification generation. A widget on the home screen notifies the user by changing color, such as but not limited to, by becoming red when the threshold is reached. This keeps the user conscious of his data usage. The notification can be in other forms also such as, but not limited to, a vibration alert, a popup, a warning, etc.

According to an embodiment of the present invention, an option is provided to restrict certain applications from using mobile data during, but not limited to, roaming. This helps in saving data cost incurred by applications while roaming.

In multi-SIM phones, the system and the method of the present invention gives users the reminder to switch to a Home network for data usage. This applies when the user has multiple SIMs, at least one in home network and other roaming networks, and when the user is using the roaming network for data usage. It enables the user to restrict background data for certain applications. This ensures that application do not consume heavy data without the user's acknowledgement.

The system and the method of the present invention track and control individual applications so that they do not consume data in the background and also during roaming. It helps in tracking download expenses in the currency set by the user such as, but not limited to, local currency, currency of foreign country, etc. A widget gives easy visualization of data consumed. It also gives a quick access to control data.

The present invention shows the usage details in a widget for easy monitoring and control. It enables the user to set his/her data plan and customize applications accordingly.

The system and the method of the present invention helps the user to save costs via easy data management by the use of data usage meters such as, but not limited to, a surfing meter, a data download meter, a data estimation meter, etc.

Figure 3:
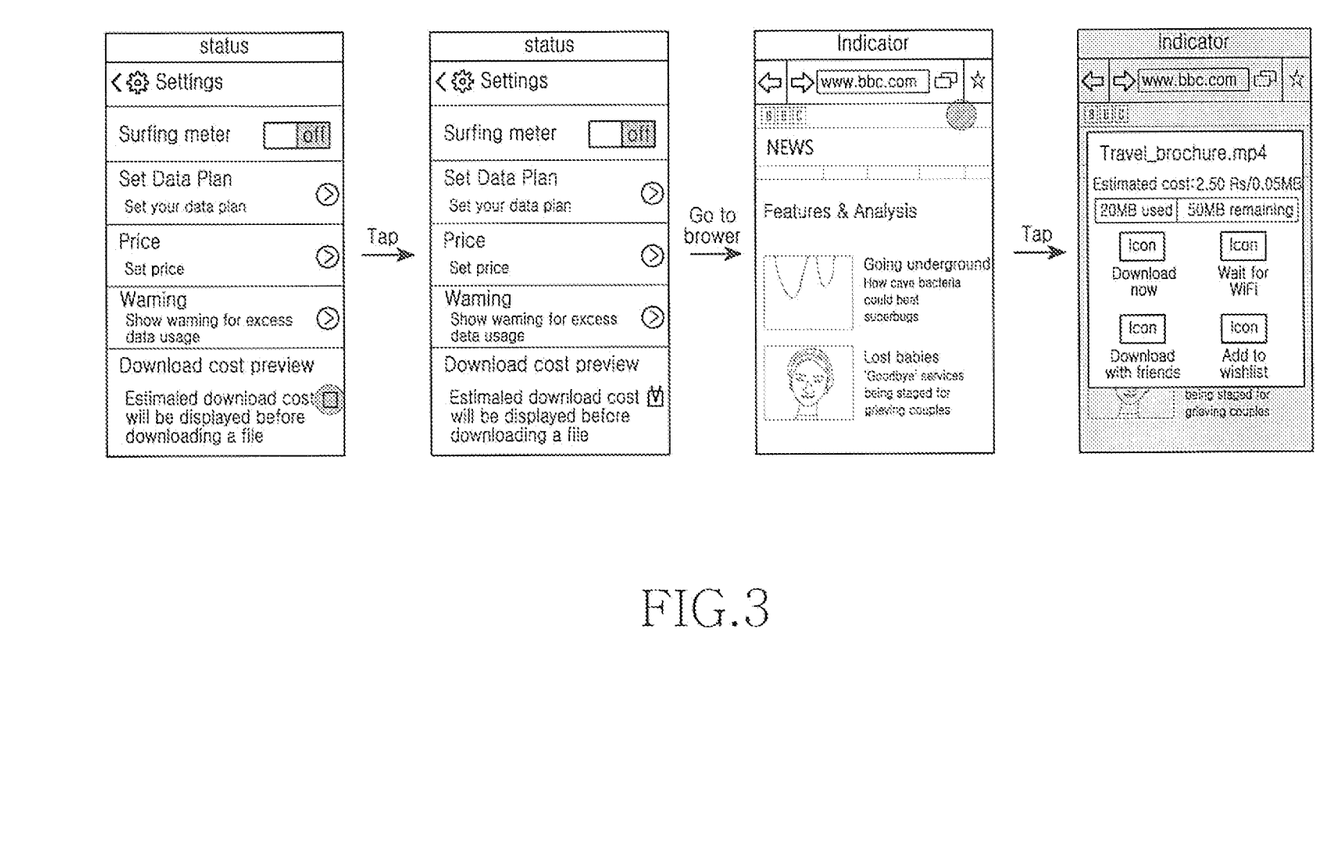
FIG. 3 illustrates screens for viewing the estimated cost when downloading content, according to an embodiment of the present invention.

FIG. 3 illustrates screens for viewing the estimated cost when downloading content, according to an embodiment of the present invention.

Referring to FIG. 3, the system provides data cost set by user per KB or per MB or in any other data unit. When the user downloads any content, the data usage cost will be calculated as Equation (1):

$$\text{Estimated Cost} = (\text{File Size(KBs or MBs or GBs)} \\ *\text{data rate(per KB/MB/GB)}) \quad (1)$$

Without departing from the scope of the invention, this estimated cost can be further rounded off to two decimal digits for the convenience of user.

Viewing the estimated cost involves selecting a file to download, calculating the file size in KBs or per MBs or in any other data unit, by a browser reading data cost details from a user defined setting, and calculating the estimated cost for downloading.

Figure 4:
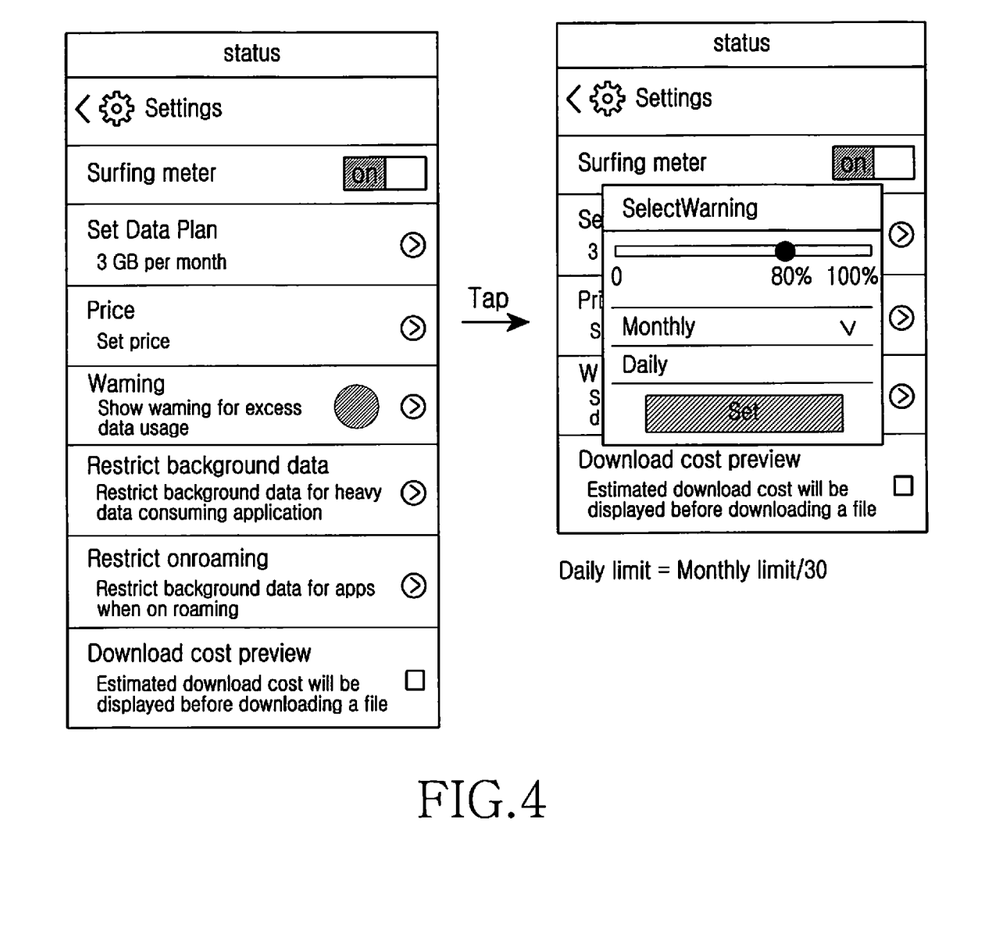
FIG. 4 illustrates screens for setting data usage notifications by the user, according to an embodiment of the present invention.

FIG. 4 illustrates screens for setting data usage notifications by the user, according to an embodiment of the present invention.

Referring to FIG. 4 a screen is shown for setting the data usage notification such as daily/monthly/weekly/quarterly/ etc. by the user.

Based on a monthly limit, a daily limit will be calculated. And then the user can set a daily data usage notification. When the daily data usage limit is crossed, notification will be displayed to the user. The daily data usage notification will protect the user from the cost of excess downloads in case of prorated data usage calculation.

A sample calculation for daily notifications is shown in Equation (2):

$$\text{Daily Data Usage Limit} = \text{Monthly Limit}/30$$

$$\text{Set daily notification} \leq \text{Daily Data usage Limit} \quad (2)$$

The same calculation can be implemented for setting notifications for other time periods such as, but not limited to daily, monthly, quarterly and annually, without departing from the scope of the invention.

Implementing the data usage notifications includes setting data usage limits and notifications, reading consumed data usage details from radio and/or network interface and calling a framework Application Programming Interface (API) to notify the user, if the data usage exceeds the threshold set by the user.

Figure 5A:
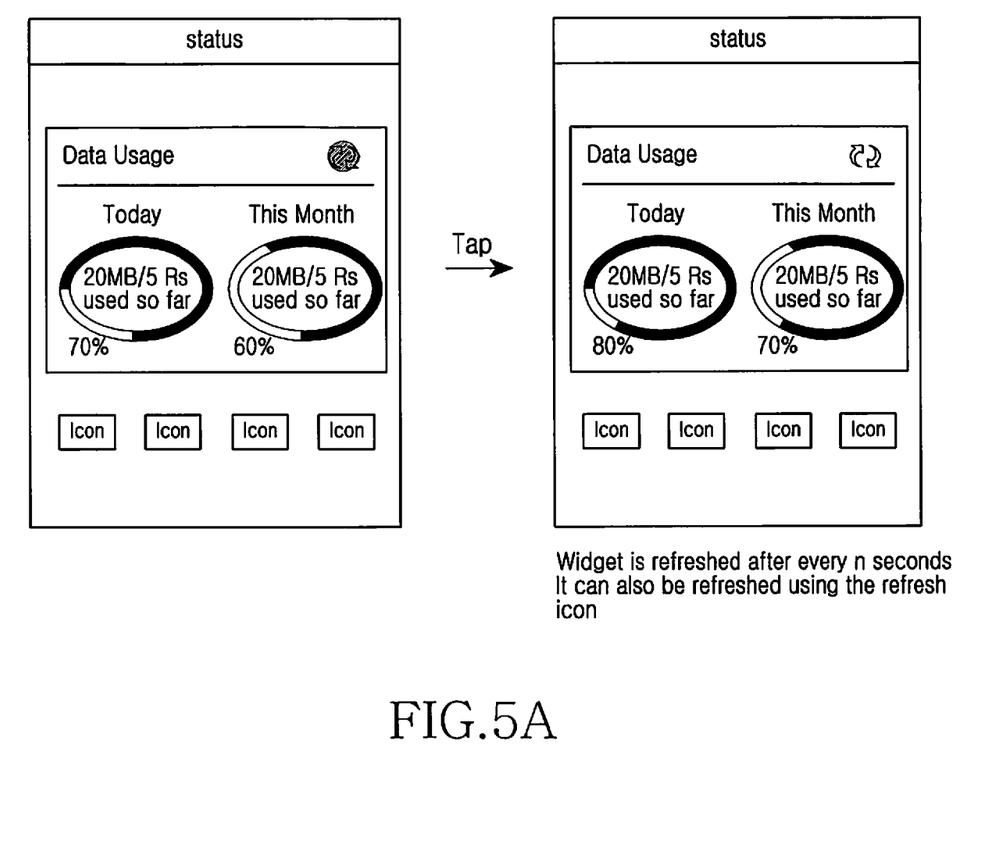
FIG. 5A illustrates a screen for a widget or an application for displaying data usage, according to an embodiment of the present invention.

FIG. 5A illustrates a screen of a widget or an application for displaying data usage, according to an embodiment of the present invention.

Referring to FIG. 5A, a widget, which is a graphical representation of the data consumed is shown. The widget is represented by a circle, where the entire circle represents the data limit. A green area of the widget represents the data consumed within a data warning range. Once the warning range is reached, the green area is replaced by a red area and a notification is generated. The colors mentioned may be different as per the user's choice or may be system defined without departing from the scope of the invention.

Once the entire area has been filled with red, it indicates that the data limit has been reached and a notification is generated from the network layer.

The widget periodically checks for the data consumed on A network such as, but not limited to, a cellular network, a Wi-Fi network, a Bluetooth network, etc., for a given data cycle and compares the consumed data with data warning values or a threshold. The widget applies a red circle at a calculated index, if the consumed value exceeds the data warning value and applies a green circle at a calculated index, if the consumed value does not exceed the data warning value.

The widget periodically checks for the data consumed on the network for a given data cycle. The widget then calculates the index (0 to 15) for the appropriate circles from the list of either green circles or red circles.

The widget then compares the consumed data with the data warning values. If the consumed data exceeds the data warning values, the red circle is applied at the calculated index; otherwise, the green circle is applied.

Figure 5B:
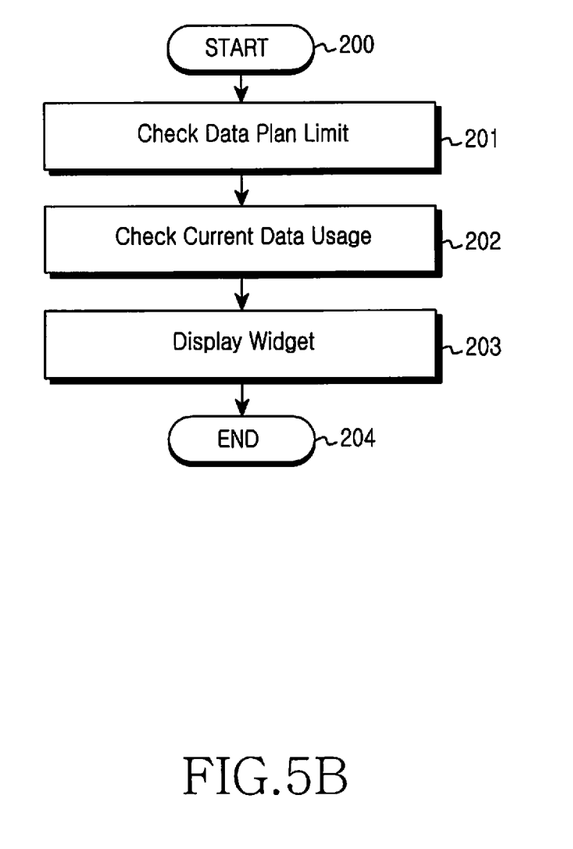
FIG. 5B is a flowchart illustrating a widget used for comparing a data plan limit with current data usage, according to an embodiment of the present invention.

FIG. 5B is a flowchart illustrating a widget used for comparing a data plan limit with current data usage, according to an embodiment of the present invention.

Referring to FIG. 5B, in step 201, the widget checks the data plan limit. In step 202, the current data usage is checked. In step 203, depending upon the result the red or green circle is displayed as the widget. If the data usage exceeds the data plan, the red circle is displayed. If the data usage does not exceed the data plan, the green circle is displayed.

Figure 6:
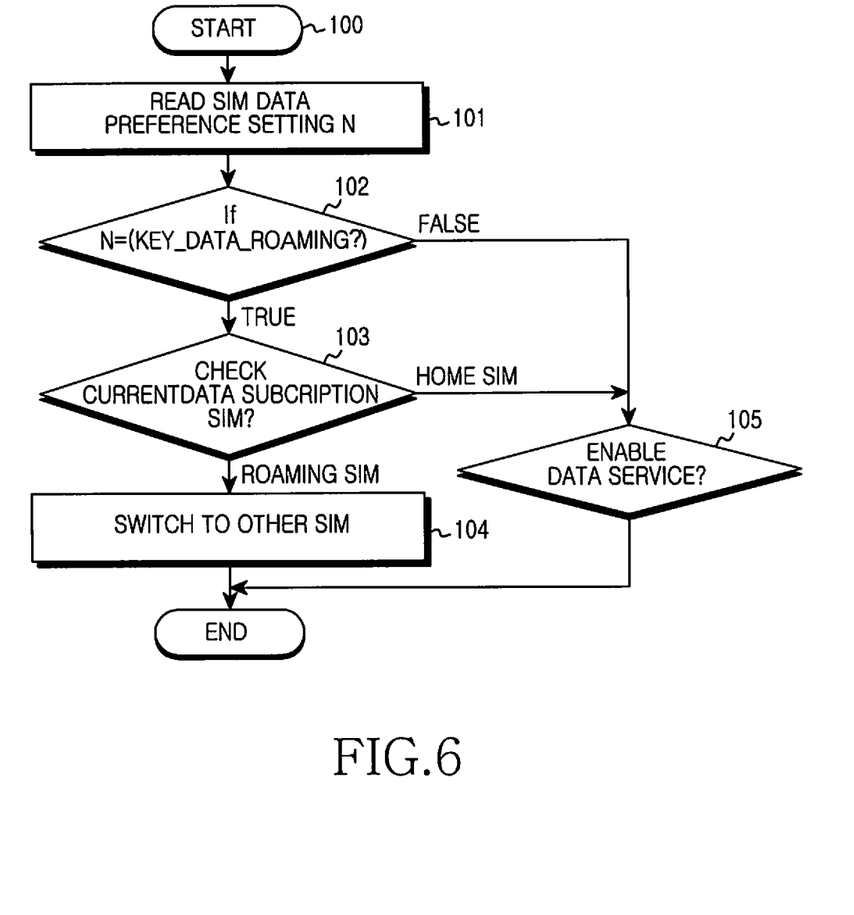
FIG. 6 is a flowchart illustrating a method of data handover on roaming in a multi-SIM phone, according to an embodiment of the present invention.

FIG. 6 is a flowchart illustrating a method of data handover on roaming in a multi-SIM phone, according to an embodiment of the present invention.

Referring to FIG. 6, a data handover on roaming in a multi-SIM phone is shown. If one SIM is moved from a home area to a roaming area, data services will be switched to another home SIM, provided a roaming status setting (KEY_DATA_ROAMING_STATUS) is set to true. If one SIM is already in roaming and the user then checks a setting for the home SIM data preference, the data services will be switched to another home SIM. This means that if the setting was turned on after moving to a roaming area, then the functionality would work.

As shown in FIG. 6, in step 101, the SIM data preference setting, N, is read. In step 102, the SIM data preference setting, N, is compared with the roaming status setting. If the SIM data preference setting is set to roaming, then in step 103, the current data subscription of the SIM is checked. In step 104, if the current data subscription SIM is a roaming SIM, the data services will be switched to another SIM, i.e. to home network SIM. If the SIM data preference setting, in step 102, is not roaming or if the current data subscription SIM is a home SIM, then in step 105, data services are enabled.

The application data usage unit 18 determines application data usage when an application launches. In this case, the framework will broadcast the launched application package detail and the data usage detail will be obtained based on an application ID (appID) from a Radio Interface Layer (RIL) and the user will be notified of the usage.

The system of the present invention will identify the application launched by using its application ID (appID). The system then queries the INetworkStatsSession class (provided by the network layer) for the data consumed by the all of the applications for a given cycle, which is given in the form of NetworkStats[INetworkStatsSession.getSummaryForAllUid (NetworkTemplate, startDate, endDate, boolean)]. The system then iterates the NetworkStat for each NetworkStats.Entry and compares the appID for the desired application. Once the desired NetworkStats.Entry is found, the data consumed is calculated for the given application using Equation (3).

$$(NetworkStats.Entry.rxBytes+NetworkStats.Entry.txBytes) \quad (3)$$

Based on the calculation a notification with the data consumed by a currently launched application may or may not be generated in the Notification Panel.

Without departing from the scope of the invention, the network could be a LAN, a WAN, a MAN, a MANET, Wi-Fi, a Bluetooth, a peer-to-peer, or the like which are known in the art.

Figure 7:
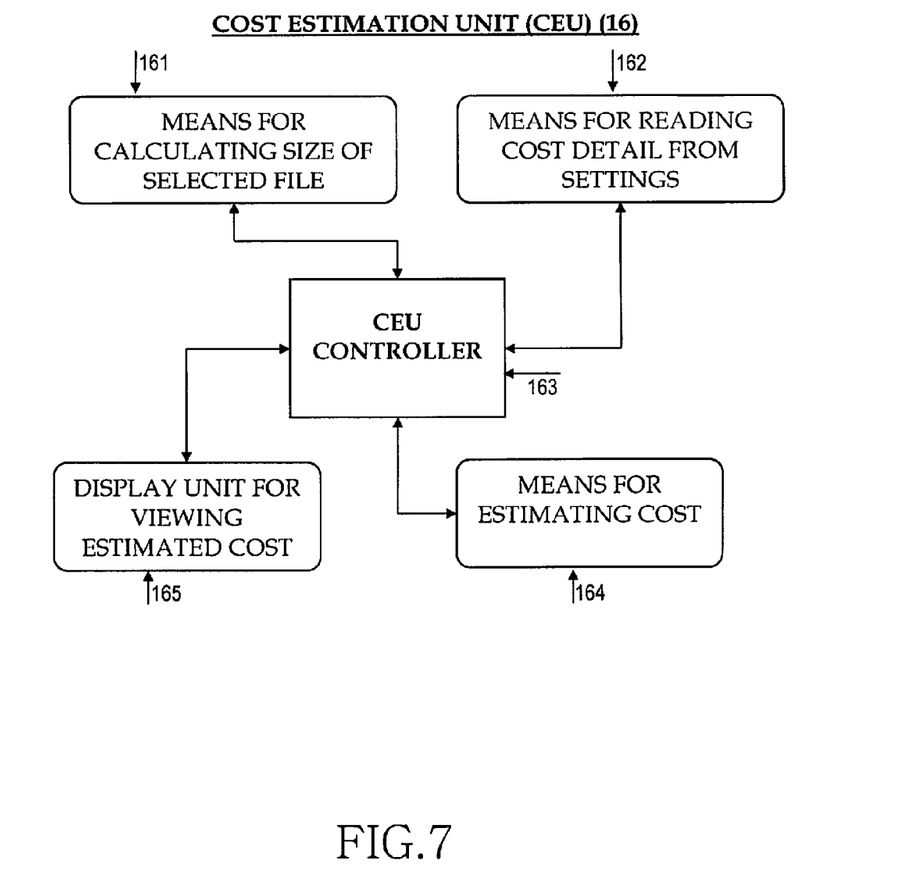
FIG. 7 is a block diagram illustrating a cost estimation unit, according to an embodiment of the present invention.

FIG. 7 is a block diagram illustrating a cost estimation unit, according to an embodiment of the present invention.

Referring to FIG. 7, the cost estimation unit 16 is provided, wherein means for calculating the size of a selected file 161, means for reading cost details from settings 162, means for estimating cost 164 and a display unit for viewing the estimated cost 165 are all connected to a Cost Estimation Unit (CEU) controller 163.

Figure 8:
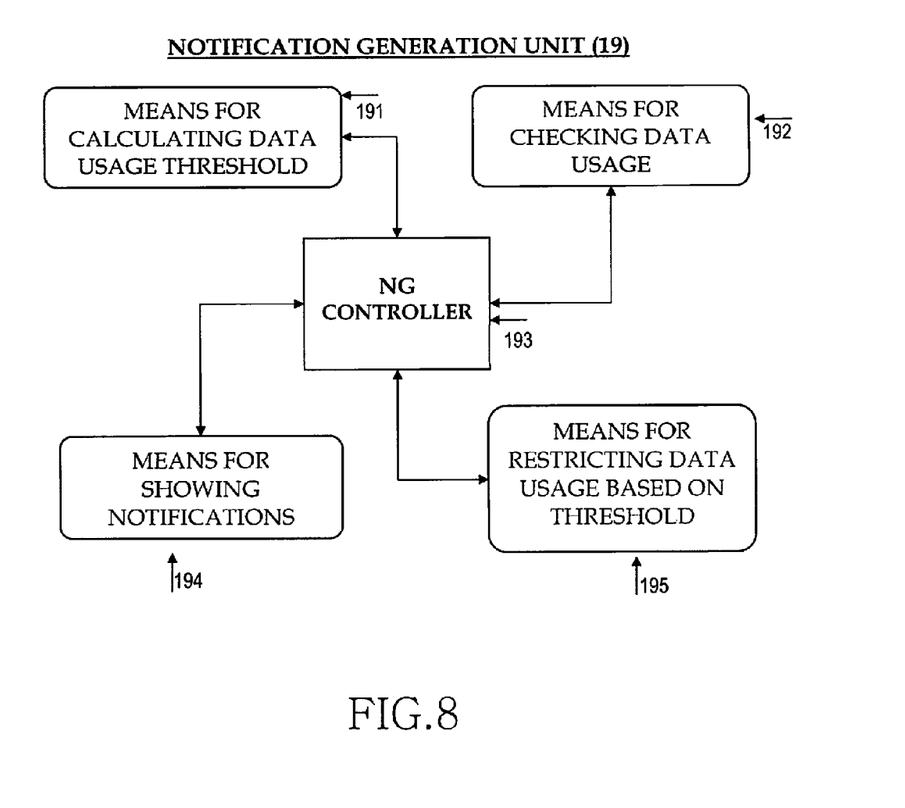
FIG. 8 is a block diagram illustrating a notification generation unit, according to an embodiment of the present invention.

FIG. 8 is a block diagram illustrating a notification generation unit, according to an embodiment of the present invention.

Referring to FIG. 8 the notification generation unit 19 is provided, wherein means for calculating data usage threshold 191, means for checking data usage 192, means for showing notifications 194, and means for restricting data usage based on a threshold 195 are all connected to a Notification Generation (NG) controller 193.

Figure 9:
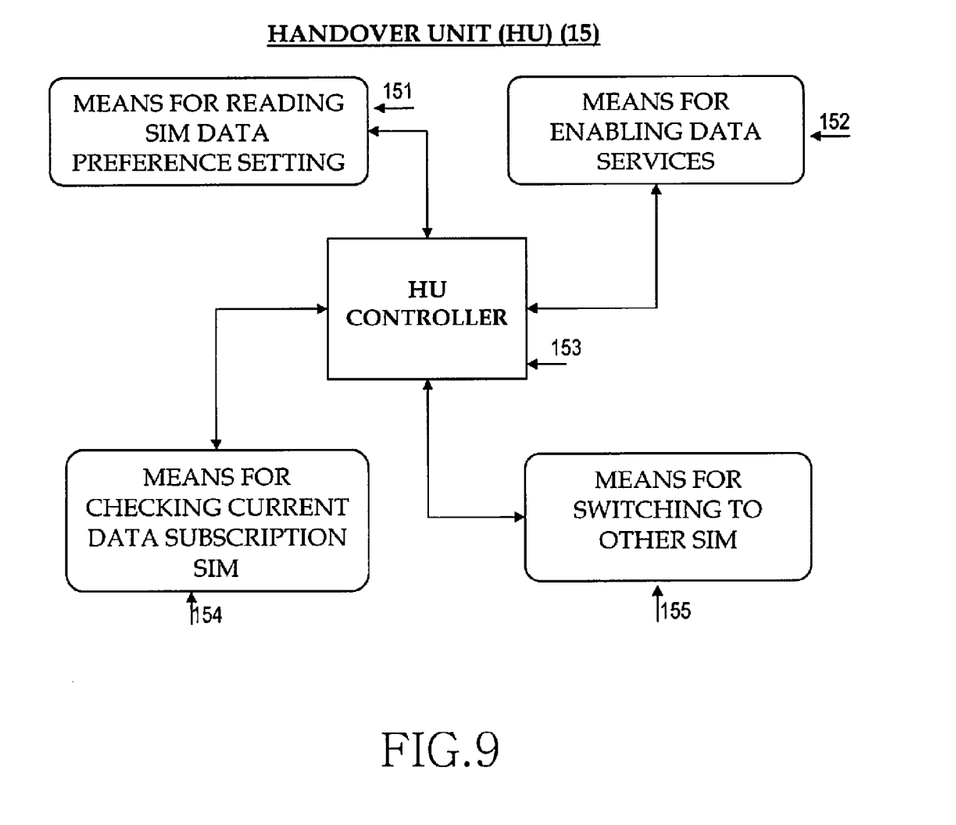
FIG. 9 is a block diagram illustrating a handover unit, according to an embodiment of the present invention.

FIG. 9 is a block diagram illustrating a handover unit, according to an embodiment of the present invention.

Referring to FIG. 9 the handover unit 15 is provided, wherein means for reading SIM data preference setting 151, means for checking current data subscription of the SIM 154, means for switching to another SIM 155, and means for enabling data services 152 are all connected to a Handover Unit (HU) controller 153.

According to an embodiment of the present invention, the complete flow can be divided into several steps:

1. Configure the Data Usage Meter.

Set a data plan—Data to be used in a month in Kilobyte, Megabytes or Giga Bytes or any other data unit. Set the cost of this data and define the currency. Set a desired threshold for showing notification. Select applications for which background data should always be restricted or can be provided based on user preferences. Select applications to restrict background data on roaming or can be provided based on user preferences.

2. Data Usage Meter Widget.

Enable data usage meter widget. The widget can be placed on a home screen, however it is not mandatory.

3. After Configuration.

A user will be able to see a notification whenever he is about to download any file. The notification will display the estimated cost of download (based on the plan set by user during configuration). The user can decide to download the file right away or decide to schedule it to be downloaded later when another type of data communication channel, such as, but not limited to, Wi-Fi, Bluetooth, etc., is available. If the user selects the download later option, the file will be downloaded automatically when another type of data communication channel, such as but not limited to Wi-Fi, Bluetooth, etc., is connected. The user will receive a notification when the threshold value for data has been reached for a time period, such as in a day or in a month. Applications for which background data has been restricted will not be consuming any data when running in background. When the user is in roaming networks, applications restricted for roaming will not access any data in the roaming network.

According to embodiments of the present invention, the estimation of cost is shown before the cost is actually incurred to help the user in making an informed decision. Knowing the details of data consumed in the currency set by the user helps in a better understanding of the costs incurred. There is an option to schedule the download on another type of data communication channel, such as but not limited to Wi-Fi, Bluetooth, etc., to save costs. Constant monitoring of data helps in making the best of the data available. Warning notifications may be customized as per the user's choice or could be system default as provided with the widget. Data costs are reduced by restricting data usage of certain applications running in the background and in roaming.

The method of an embodiment of the present invention helps in tracking download expenses in the currency set by user. The method shows the usage details in a widget or an application and data is displayed for easy monitoring and control. The method enables a user to set his/her data plan and customize an application accordingly. The data usage meter widget gives easy visualization of data consumed. The method also gives a quick access to control data consumption.

According to an embodiment of the present invention an estimate of the cost of download before, after and during downloading of the data is shown. A user can check the estimated cost for download and decide to download now or later. User can also chose to select whether to download content from cellular data communication network or by another type of data network as per the estimated cost. It always shows the details of data usage in the currency set by user and it provides an option to restrict certain applications from using mobile data during, but not limited to, roaming. This helps in saving data cost incurred by applications in roaming.

In multi-SIM phones, the method of the present invention gives users a reminder or notification to switch to a home network for data usage. This applies when the user has multiple SIMs, one in the home network and others in the roaming network and when the user is using the roaming network for data usage.

The system of the present invention enables the user to restrict background data for certain applications. This ensures that application do not consume heavy data without the user's acknowledgement.

While the foregoing written description of the invention enables one of ordinary skill to make and use what is considered presently to be the best mode thereof, those of ordinary skill will understand and appreciate the existence of variations, combinations and equivalents of the specific embodiments, methods, and details herein.

While the various embodiments of the present invention have been described and illustrated, it will be appreciated that various changes can be made therein without departing from the scope of the invention, as defined by the appended claims and their equivalents.

What is claimed is:

1. A method for data usage management in an electronic device, the method comprising:
   tracking an estimated cost of a download in a currency set by a user before the download;
   determining the estimated cost of the download in the currency set by the user;

displaying the estimated cost of the download;
determining application data usage by reading consumed data usage details from at least one of a radio interface and a network interface;
implementing notifications of the data usage; and
displaying the data usage, wherein a widget or an application is used to display the data usage.

2. The method of claim 1, wherein determining the estimated cost of the download comprises:
selecting a file to download;
calculating a size of the file;
reading data cost details from a setting; and
calculating an estimated cost of the download.

3. The method of claim 1, wherein implementing notifications of data usage comprises:
calculating a data limit for a time period;
reading consumed data usage details from at least one of a radio interface and a network interface;
displaying a data usage notification, when data usage exceeds the data limit; and
restricting the data usage, when the data usage exceeds the data limit.

4. The method of claim 1, wherein the widget periodically checks for the data consumed on a cellular network for a given data cycle and compares the consumed data with a data warning value.

5. The method for of claim 4, wherein the widget applies a red circle at a calculated index, if the consumed data exceeds from the data warning value.

6. The method of claim 4, wherein the widget applies a green circle at a calculated index, if the consumed data does not exceed the data warning value.

7. The method of claim 1, further comprising switching data services in a multi-SIM phone from a roaming SIM to a non-roaming SIM.

8. The method of claim 7, wherein switching data services comprises:
reading a SIM data preference setting;
checking a current data subscription SIM;
switching the data services to another SIM, when the current SIM data subscription SIM is the roaming SIM;
enabling data services, when the SIM data preference setting is not the roaming SIM.

9. A system for data usage management in an electronic device, comprising:
a display unit;
a cost estimation unit configured to track and determine an estimated cost of a download before the download;
a notification generation unit configured to implement notifications of the data usage, when a threshold is reached;
a widget configured to graphically represent the data usage; and
an application data usage unit configured to determine application data usage by reading consumed data usage details from at least one of a radio interface and a network interface.

10. The system of claim 9, wherein the system provides an option to track and control individual applications to prevent a consumption of data used by background applications and while roaming.

11. The system of claim 9, wherein the system provides a user with a reminder to switch to a home network for data usage.

12. The system of claim 9 further comprising a handover unit configured to switch data services in a multi-SIM phone from a roaming SIM to a non-roaming SIM.

* * * * *